(12) United States Patent
Ishizaka

(10) Patent No.: US 12,287,789 B2
(45) Date of Patent: Apr. 29, 2025

(54) INFORMATION PROCESSING DEVICE, METHOD, AND RECORDING MEDIUM

(71) Applicant: NEC Corporation, Tokyo (JP)

(72) Inventor: Kazuhisa Ishizaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/566,206

(22) PCT Filed: Jun. 9, 2021

(86) PCT No.: PCT/JP2021/021852
§ 371 (c)(1),
(2) Date: Dec. 1, 2023

(87) PCT Pub. No.: WO2022/259400
PCT Pub. Date: Dec. 15, 2022

(65) Prior Publication Data
US 2024/0256542 A1 Aug. 1, 2024

(51) Int. Cl.
*G06F 16/2453* (2019.01)

(52) U.S. Cl.
CPC .............. *G06F 16/24544* (2019.01)

(58) Field of Classification Search
CPC .......... G06F 16/24544; G06F 16/2453
See application file for complete search history.

(56) References Cited

U.S. PATENT DOCUMENTS

| | | | |
|---|---|---|---|
| 2008/0033914 A1* | 2/2008 | Cherniack | G06F 16/283 |
| 2009/0177621 A1 | 7/2009 | Le et al. | |
| 2017/0068891 A1 | 3/2017 | Shironoshita | |
| 2022/0164332 A1* | 5/2022 | Hoang | G06F 16/2456 |

FOREIGN PATENT DOCUMENTS

| | | |
|---|---|---|
| JP | H06-208491 A | 7/1994 |
| JP | 2007-073024 A | 3/2007 |
| JP | 2007-334388 A | 12/2007 |
| JP | 2019-168820 A | 10/2019 |

OTHER PUBLICATIONS

International Search Report for PCT Application No. PCT/JP2021/021852, mailed on Sep. 7, 2021.
Ikeuchi Takahiro, "Introduction to SQL starting from now on", 1st edition, Gijutsu-Hyoron Co., Ltd, May 13, 2018, pp. 203-208.
Iizawa Atsushi et al., "Interesting course of database 9", bit, Jan. 1, 1992, vol. 24, No. 1, pp. 99-109.
JP Office Communication for JP Application No. 2023-526708, mailed on Dec. 3, 2024 with English Translation.

* cited by examiner

Primary Examiner — Cam Y T Truong
(74) Attorney, Agent, or Firm — Sughrue Mion, PLLC

(57) ABSTRACT

An information processing device sets: a first argument of a first table join instruction to a second table join instruction as the first argument of the second table join instruction; a second argument of the first table join instruction to the first table join instruction as the first argument of the first table join instruction; a first output data table generated by the first intermediate table generation instruction to the first table join instruction as the second argument of the first table join instruction; and a second output data table generated by the first table join instruction after changing the first and second arguments of the first table join instruction to the second table join instruction as the second argument of the second table join instruction.

9 Claims, 13 Drawing Sheets

INFORMATION PROCESSING DEVICE, METHOD, AND RECORDING MEDIUM

This application is a National Stage Entry of PCT/JP2021/021852 filed on Jun. 9, 2021, the contents of all of which are incorporated herein by reference, in their entirety.

TECHNICAL FIELD

This disclosure relates to an information processing device, method, and recording medium.

BACKGROUND ART

Patent Document 1 discloses that to each other are input to efficiently extract data features from a huge amount of data, when tables PQR that are dissimilar, the three tables can be joined into one by first joining P and R and then Q, and then the joined table can be used to analyze the relationship between data values in the fields B and D.

PRIOR ART DOCUMENTS

Patent Documents

Patent Document 1: Japanese Unexamined Patent Application, First Publication No. 2019-168820

SUMMARY OF THE INVENTION

Problems to be Solved by the Invention

In the invention described in the document, there is no mention of reducing the size of intermediate tables generated during the process of aggregating and joining multiple tables.

In view of the above circumstances, it is an example object of this invention to provide an information processing device, method, and recording medium that solve the above-mentioned problems.

Means for Solving the Problem (1) One example aspect of the present disclosure is an information processing device provided with a join transform means that, in a program to be transformed, when a data table serving as a first argument of a second table join instruction, which is a table join instruction that is executed consecutively after a first table join instruction which is a table join instruction, is a data table generated by the first table join instruction, and a data table serving as a second argument of the second join instruction is a data table generated by a first intermediate table generation instruction that is an intermediate table generation instruction having, as an argument, a data table that serves as a first argument of the first table join instruction, sets the data table serving as the first argument of the first table join instruction to be input to the first argument of the second table join instruction, sets the data table serving as a second argument of the first table join instruction to be input to the first argument of the first table join instruction, sets the data table generated by the first intermediate table generation instruction to a second argument of the first table join instruction, and sets the data table generated by the first table join instruction after the argument change to the second argument of the second table join instruction.

(2) One example aspect of the present disclosure is a method used for a computer, the method having a step that, in a program to be transformed, when a data table serving as a first argument of a second table join instruction, which is a table join instruction that is executed consecutively after a first table join instruction which is a table join instruction, is a data table generated by the first table join instruction, and a data table serving as a second argument of the second join instruction is a data table generated by a first intermediate table generation instruction that is an intermediate table generation instruction having, as an argument, a data table that serves as a first argument of the first table join instruction, sets the data table serving as the first argument of the first table join instruction to be input to the first argument of the second table join instruction, a step that sets the data table serving as a second argument of the first table join instruction to be input to the first argument of the first table join instruction, a step that sets the data table generated by the first intermediate table generation instruction to a second argument of the first table join instruction, and a step that sets the data table generated by the first table join instruction after the argument change to the second argument of the second table join instruction.

(3) One example aspect of the present disclosure is a recording medium in which is recorded a program that causes a computer to execute, in a program to be transformed, when a data table serving as a first argument of a second table join instruction, which is a table join instruction that is executed consecutively after a first table join instruction which is a table join instruction, is a data table generated by the first table join instruction, and a data table serving as a second argument of the second join instruction is a data table generated by a first intermediate table generation instruction that is an intermediate table generation instruction having, as an argument, a data table that serves as a first argument of the first table join instruction, a step of setting the data table serving as the first argument of the first table join instruction to be input to the first argument of the second table join instruction, a step of setting the data table serving as a second argument of the first table join instruction to be input to the first argument of the first table join instruction, a step of setting the data table generated by the first intermediate table generation instruction to a second argument of the first table join instruction, and a step of setting the data table generated by the first table join instruction after the argument change to the second argument of the second table join instruction.

Effect of Invention

According to this disclosure, the size of an intermediate table can be reduced to reduce the processing load when obtaining a final table containing the results of aggregating the features of the input data through the generation of the intermediate table.

EXAMPLE EMBODIMENT

Example embodiments are described in detail below with reference to the accompanying drawings. The following example embodiments are not intended to limit the invention according to the claims, and not all of the combinations of features described in the example embodiments are essential to the invention. Two or more of the multiple features described in the example embodiment may be optionally combined. The same reference numbers are used for identical or similar configurations, and redundant explanations are omitted.

First Example Embodiment

Figure 1:
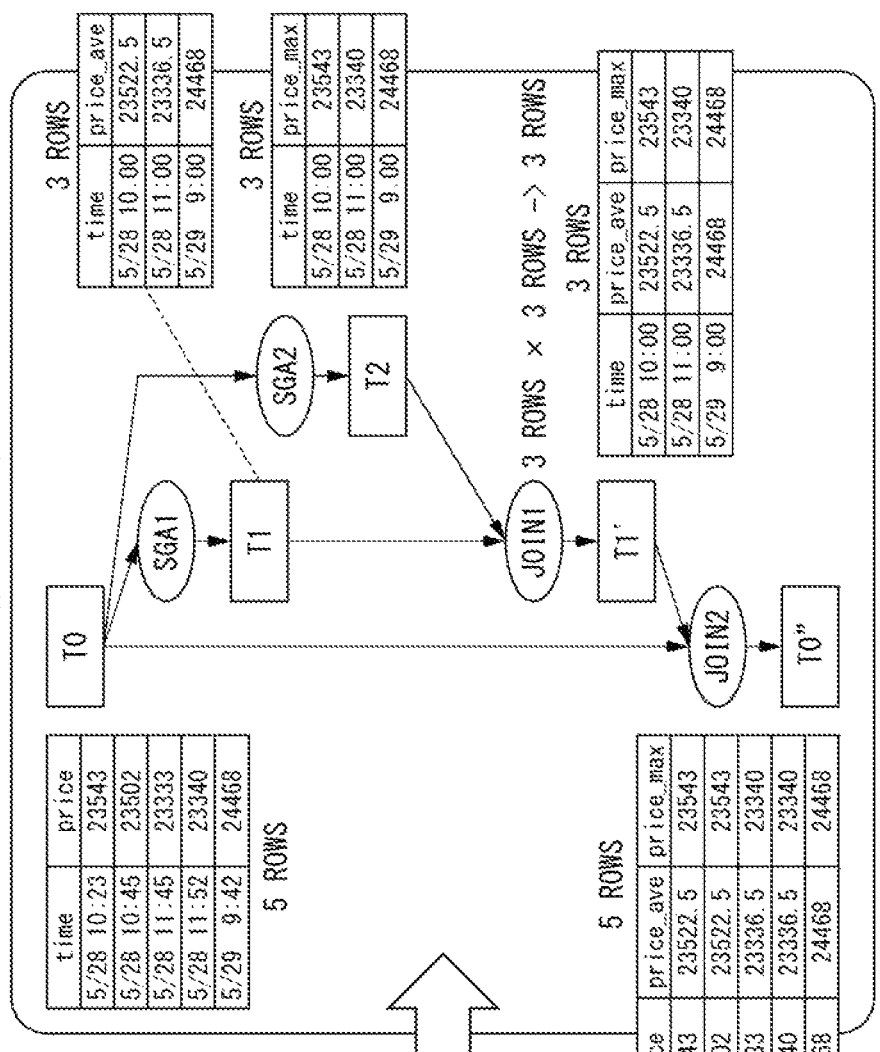
FIG. 1 is a diagram showing an overview of the operation of the information processing device 1 in the first example embodiment.
Figure 1:
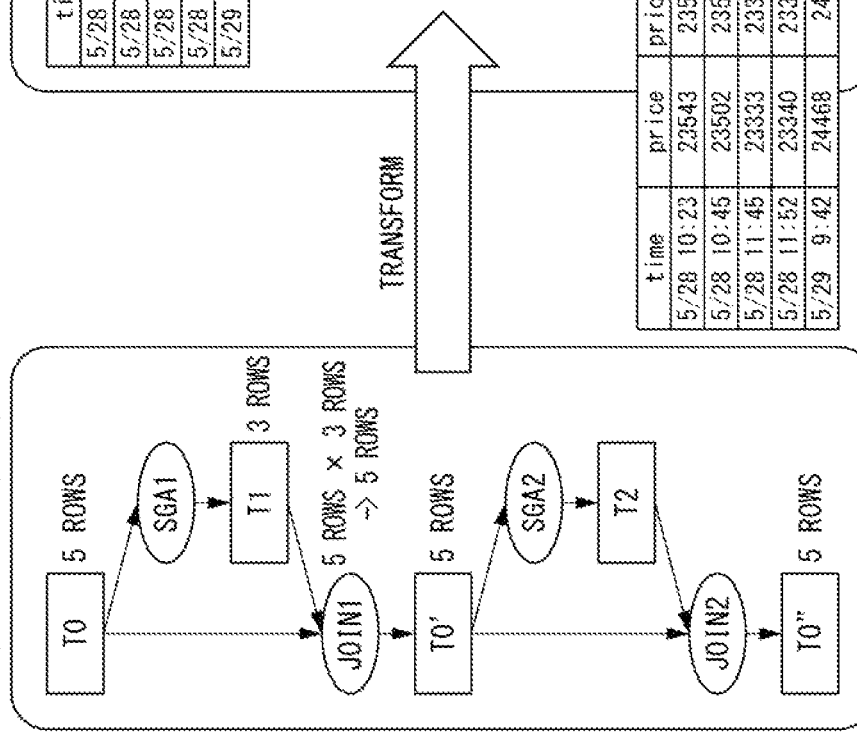

FIG. 1 is a diagram showing an overview of the operation of the information processing device 1 in the first example embodiment. The information processing of this disclosure relates to technology that performs selection, grouping, and aggregation processing on input tables, and joins the data (features) resulting from the aggregation with the input tables. In the information processing of this disclosure, an aggregate transform portion 113 and the join transform portion 114 provided by the information processing device 1 transform a program for executing the first processing flow (processing flow 1) shown in FIG. 1 into a program for executing the second processing flow (processing flow 2). The transformation of the program may be realized only by the join transform portion 114.

As described below, the processing flow 2 has a lighter processing load than the processing flow 1. Therefore, to reduce the processing load, the aggregate transform portion 113 and the join transform portion 114 perform the above transformation process. Programs are written in programming languages including high-level languages, low-level languages, and assembly languages. The processing by the aggregate transform portion 113 and the join transform portion 114 are described below.

In the present example embodiment, an table that is input contains two or more rows of elements and at least two columns of elements. The elements in the first column contain time information. The elements in the second column contain information on the prices corresponding to the times included in each row of the first column. The price may be, for example, the price of a virtual currency, or the base price of a given stock or mutual fund. An aggregate join processing portion 112 provided by the information processing device 1 selects the columns of prices in the input table and groups (groupby) them by time periods separated by hourly time. The descriptions of the rows and columns may be interchanged. That is, for example, the price information corresponding to each of the times included in each column of the first row may be included in the second row.

The aggregate join processing portion 112 generates features by aggregating the prices within each grouping. Features include the average, maximum or minimum value of prices within each group. The aggregate join processing portion 112 joins the features into a new column of rows containing the times included in each group.

In FIG. 1, the initial table T0 is a table containing initial input data. The acquisition portion 111 provided by the information processing device 1 acquires the initial table T0. The intermediate table T1 is an intermediate table acquired after the aggregate join processing portion 112 performs the processes of selecting the columns for which the aggregation process is to be executed, groupby, and aggregation from the initial table T0. The series of processes related to input/selection, groupby, and aggregation are also referred to as SGA processing (or simply SGA), using these acronyms. Details of the SGA are described below.

The intermediate table T0' is the intermediate table acquired when the aggregate join processing portion 112 performs the first join process of joining the intermediate table T1 to the initial table T0. The join process is also referred to as JOIN. The first join process is also referred to as JOIN1. Details of the JOIN process are described below. The intermediate table T2 is acquired by the aggregate join processing portion 112 performing a second SGA process (SGA2) on the intermediate table T0'. The aggregate join processing portion 112 performs a second JOIN process (JOIN2) using the initial table T0' and the intermediate table T2 to obtain the final table T0".

The initial table T0 is a table containing multiple rows and multiple columns of elements. The intermediate table T1 and intermediate table T2 contain features of the input table. The aggregate join processing portion 112 extracts the features of the input table by performing SGA on the input table. As a result of the features being extracted, the number of rows of elements in the intermediate tables T1 and T2 is less than the number of rows of elements in the initial table T0. The number of columns of elements in intermediate tables T1 and T2 may be less or more than the number of columns of elements in the initial table T0.

For example, the initial table T0 may contain 5 rows of elements, while the intermediate table T1 and intermediate table T2 may contain 3 rows of elements. The intermediate table T0' contains 5 rows of elements after JOIN1 processing. The final table T0" contains 5 rows of elements after JOIN2 processing by the aggregate join processing portion 112.

In processing flow 2, the aggregate transform portion 113 and the join transform portion 114 transform some of the inputs and the order thereof in the SGA and JOIN processing from processing flow 1. SGA1 and the resulting intermediate table T1 are the same as in processing flow 1. In processing flow 2, the inputs and outputs of SGA2, JOIN1, and JOIN2 differ from those in processing flow 1.

Specifically, SGA2 in processing flow 2 differs from processing flow 1 in that the input is the initial table T0. In JOIN1 of processing flow 2, the inputs are the intermediate tables T1 and T2. Intermediate table T1 and intermediate table T2 contain three rows of elements. The inputs and outputs of JOIN1 differ from processing flow 1 in that they both contain three rows. In other words, the number of rows included in the input and output of JOIN1 in processing flow 2 is less than the number of rows included in the output of JOIN1 in processing flow 1. Therefore, the size of the intermediate table can be smaller in processing flow 2 than in processing flow 1.

Figure 2:
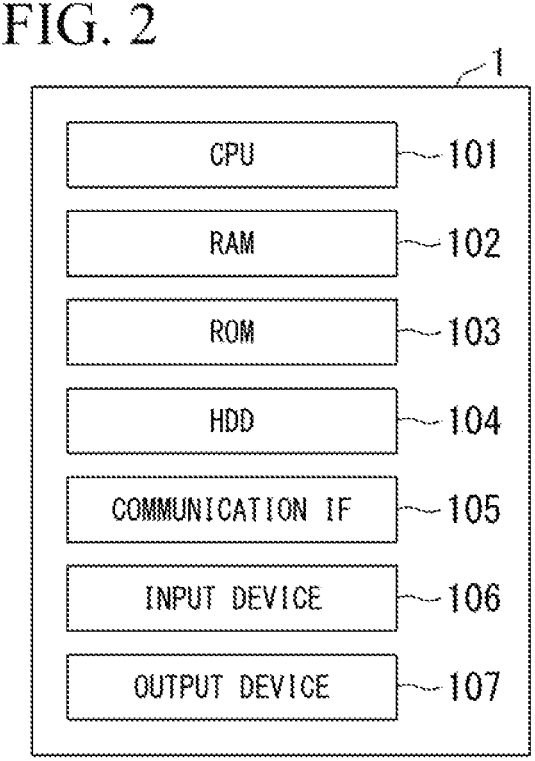
FIG. 2 is a block diagram showing the hardware configuration of the information processing device 1 in the first example embodiment.

FIG. 2 is a block diagram showing the hardware configuration of the information processing device 1 in the first example embodiment. The information processing device 1 is an electronic computer. The information processing device 1 can be a personal computer (PC), a workstation, a smartphone, or a tablet computer. The information processing device 1 is provided with a central processing unit (CPU) 101, a random access memory (RAM) 102, a read-only memory (ROM) 103 and a hard disk drive (HDD) 104.

The information processing device 1 is provided with a communication interface (IF) 105, an input device 106, and an output device 107. The CPU 101, RAM 102, ROM 103, HDD 104, communication IF 105, input device 106, and output device 107 are interconnected via buses, wiring, and driving devices not shown in FIG. 2.

The CPU 101 performs predetermined calculations in accordance with programs stored in the ROM 103, HDD 104, and the like. The CPU 101 is a processing unit that also has the function of controlling each part of the information processing device 1. The RAM 102 consists of a volatile storage medium. The RAM 102 provides a temporary memory area. The temporary memory area is necessary for the operation of the CPU 101.

The ROM 103 consists of a nonvolatile storage medium. The ROM 103 stores necessary information such as programs used in the operation of the information processing device 1. The HDD 104 consists of a nonvolatile storage medium and is a storage device that temporarily stores data sent and received with an earphone 2, stores programs for operating the information processing device 1, and so on. The HDD 104 can be a solid state drive (SSD) instead of a HDD.

The communication IF 105 is a communication interface that enables transmission and reception of data and control information, and the like, with other devices. The communication IF 105 is based on standards such as Bluetooth (registered trademark) and Wi-Fi (registered trademark), for example.

The input device 106 is a device used by the user H to operate the information processing device 1. The input device 106 may be a touch screen panel, for example, or a keyboard, mouse, trackball, or pen input device.

The output device 107 is a display device used for the display of information, display of a graphical user interface (GUI) for operation input, and the like. The output device 107 is a liquid crystal display, an organic electroluminescence (EL) display, and the like. The input device 106 and the output device 107 may be integrally formed as a touch panel.

The hardware configuration shown in FIG. 2 is an example. Additional devices other than those shown in FIG. 2 may be added, or some devices may not be provided. Some of the devices shown in FIG. 2 may be replaced by other devices with similar functions. Furthermore, some functions of this example embodiment may be provided by other devices via a network. The functions of this example embodiment may be distributed and realized in multiple devices. The hardware configuration shown in FIG. 2 can be modified as needed.

Figure 3:
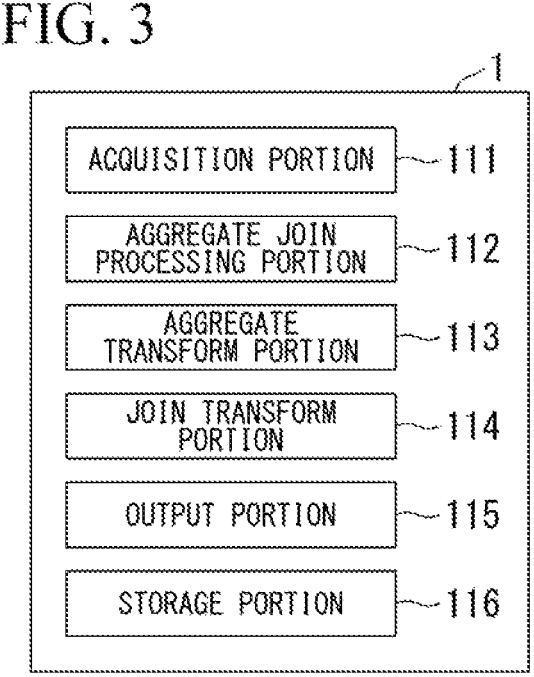
FIG. 3 is a function block diagram of the information processing device 1 in the first example embodiment.

FIG. 3 is a function block diagram of the information processing device 1 in the first example embodiment. The information processing device 1 is provided with an acquisition portion 111, an aggregate join processing portion 112, an aggregate transform portion 113, a join transform portion 114, an output portion 115, and a storage portion 116. The function of the acquisition portion 111 is realized by the communication IF 105 and/or the input device 106.

The functions of the aggregate join processing portion 112, the aggregate transform portion 113, and the join transform portion 114 are realized by the CPU 101 loading a program stored in ROM 103, HDD 104, etc. into RAM 102 and executing it. The function of the output portion 115 is realized by the communication IF 105 and/or the output device 107. The storage portion 116 is at least one of the RAM 102, the ROM 103, and the HDD 104. The storage portion 116 may be an external HDD or flash memory.

Figure 4:
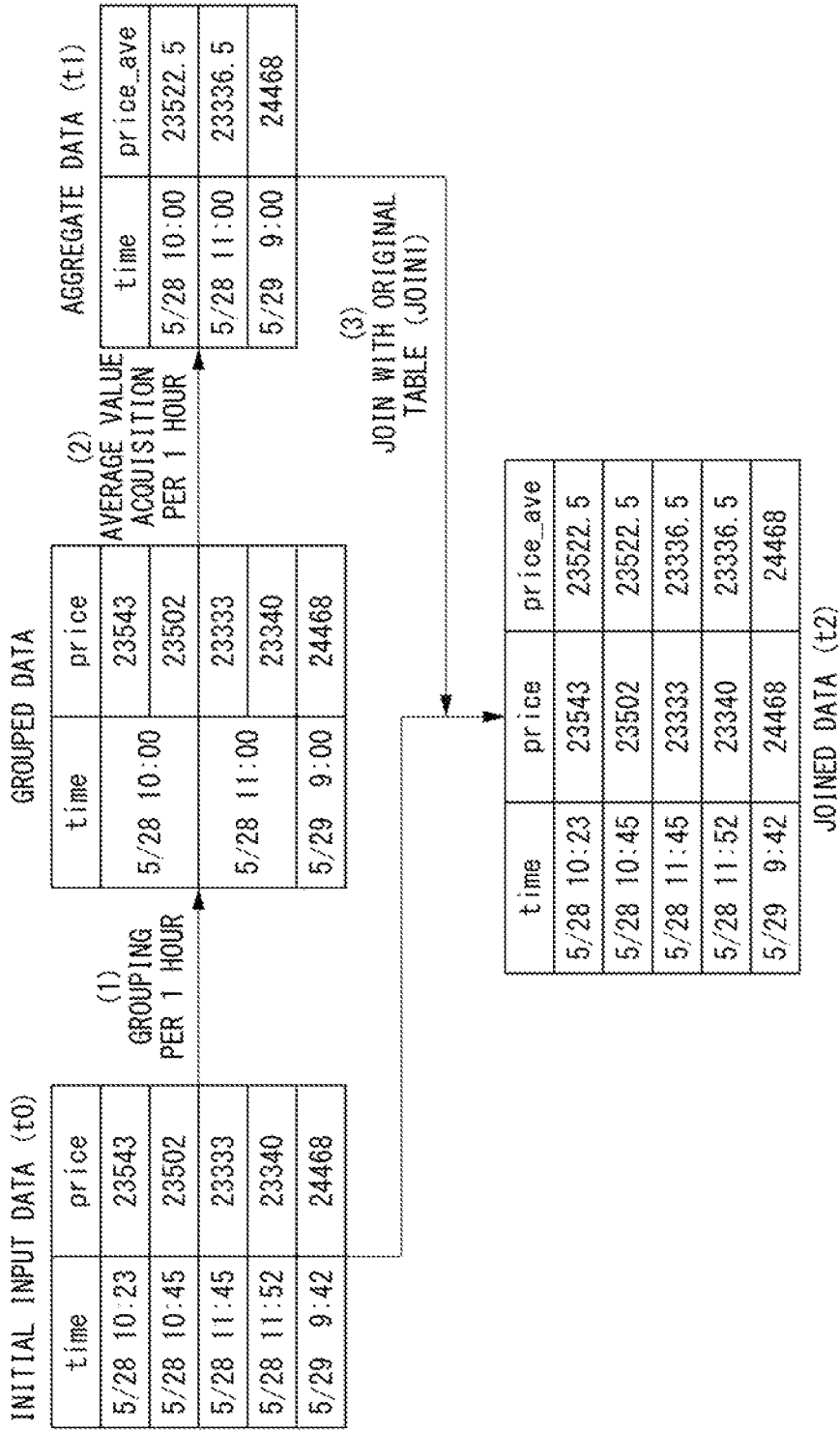
FIG. 4 is a schematic diagram showing the aggregation and join process in the first example embodiment.

FIG. 4 is a schematic diagram showing the aggregation and join process in the first example embodiment. The initial input table (t0) is represented by a table with 5 rows and 2 columns, but the number of rows and columns is not limited thereto. The initial input table represents the time of day and the amount of virtual currency corresponding to that time. The acquisition portion 111 acquires the time and the corresponding amount of virtual currency at that time. The time in the initial input table may be referred to as the first plurality of values and the amount of virtual currency as the second plurality of values.

First, as process (1), the aggregate join processing portion 112 groups the initial input table according to the rule of separating time by hour (first criterion) and groups the amount of each group virtual currency. For example, the aggregate join processing portion 112 groups the initial input table into amounts obtained between 10:00 and 11:00 on May 28, amounts obtained between 11:00 and 12:00 on May 28, and amounts obtained between 9:00 and 10:00 on May 29.

In process (2), the aggregate join processing portion 112 aggregates the average values for each time period (group) as an aggregate table (t1) as the first aggregation process. In the first aggregation process, the "take the average" rule may be referred to as the second criterion. The aggregate join processing portion 112 groups the times obtained by the acquisition portion 111 by hour, so the number of rows in t1 is 3. In other words, for the input table, the aggregate join processing portion 112 extracts average values per hour (an example of a feature amount), so the number of rows of output t1 is reduced to 3 for 5 rows of input. In the present disclosure, the aggregation process may be rephrased as an aggregation instruction or as an intermediate table generation instruction.

In process (3), the aggregate join processing portion 112 joins t1 to the corresponding time in the original table as the first join process. The result of the join is represented as t2. At t2, the aggregate join processing portion 112 adds (joins) the 10:00 average value 23522.5 to the corresponding columns at times 10:23 and 10:45. The aggregate join processing portion 112 adds (joins) the 11:00 average value 23336.5 to the corresponding columns at times 11:45 and 11:52. The aggregate join processing portion 112 adds (joins) the May 29 9:00 average value 24468 to the corresponding column at time 9:42. Here, the number of rows in the joined table (intermediate table t2) is 5 rows due to the first join process.

In the present disclosure, a join process (join instruction) is a process or instruction that takes two tables as arguments. The join process adds the data contained in the second argument table to the first argument table. The process of obtaining (selecting), grouping, and aggregating the initial input tables may be collectively represented as SGA.

Figure 5:
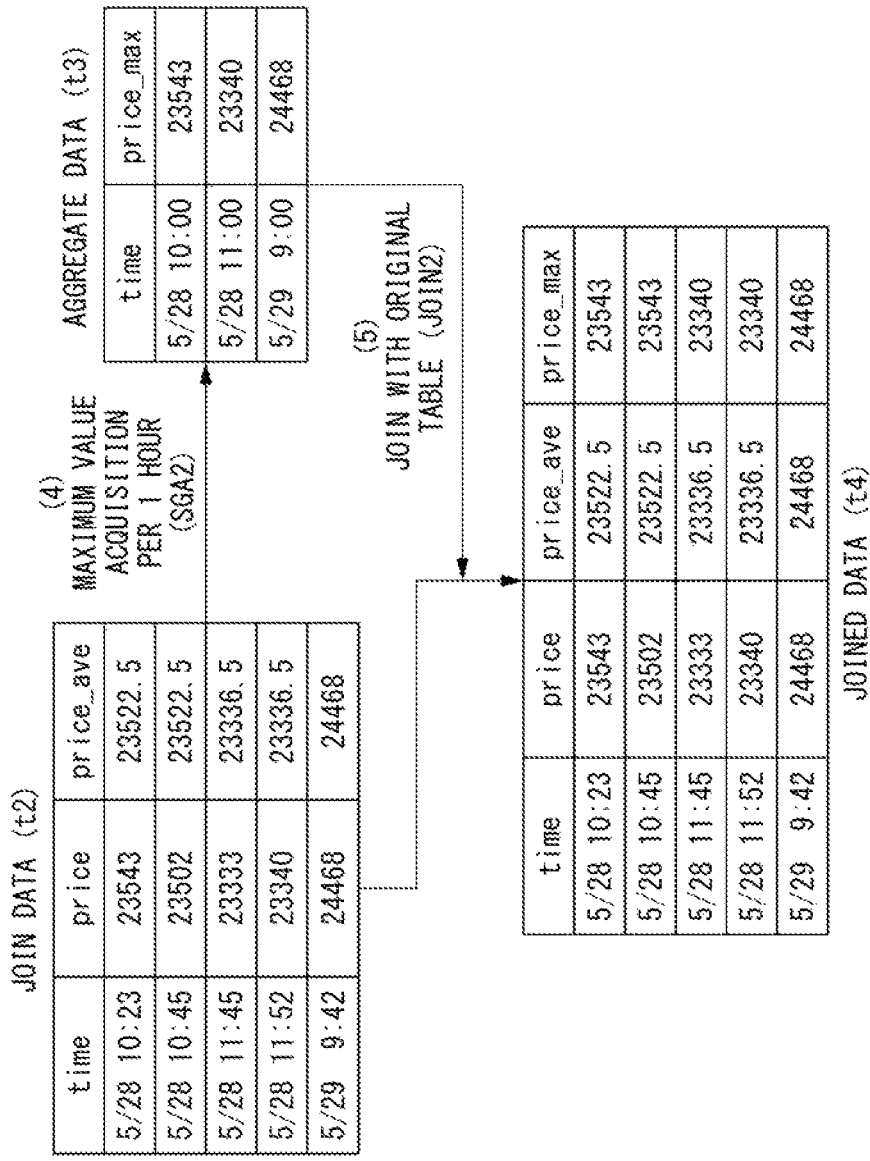
FIG. 5 is a schematic diagram showing the aggregation and join process in the first example embodiment.

FIG. 5 is a schematic diagram showing the aggregation and join process in the first example embodiment. The diagram in FIG. 5 shows the continuation of the process shown in FIG. 4. The process shown in FIG. 5 relates to processing flow 1 as in FIG. 4. As process (4), the aggregate join processing portion 112 performs the second aggregation process after acquiring (selecting) the join table t2. In the second aggregation process, the aggregate join processing portion 112 groups the virtual currency amounts by time hour. The aggregate join processing portion 112 obtains the maximum value for each time period as the aggregate table t3. The rule of taking the maximum value in the second aggregation process may be referred to as the fourth criterion. For the input table, the aggregate join processing portion 112 extracts the maximum value (an example of a feature) per hour, so the number of rows of output t3 is reduced to 3, compared to the 5 rows of input.

In process (5), as the second join process, the aggregate join processing portion 112 joins t3 to table t2. The joined result is represented as the joined table t4. As the joined table t4, the result of the aggregation process (i.e., the average and maximum values for each time period) joined with the initial input table to may be referred to as the input table feature. The feature may be used as training data in machine learning.

Figure 6:
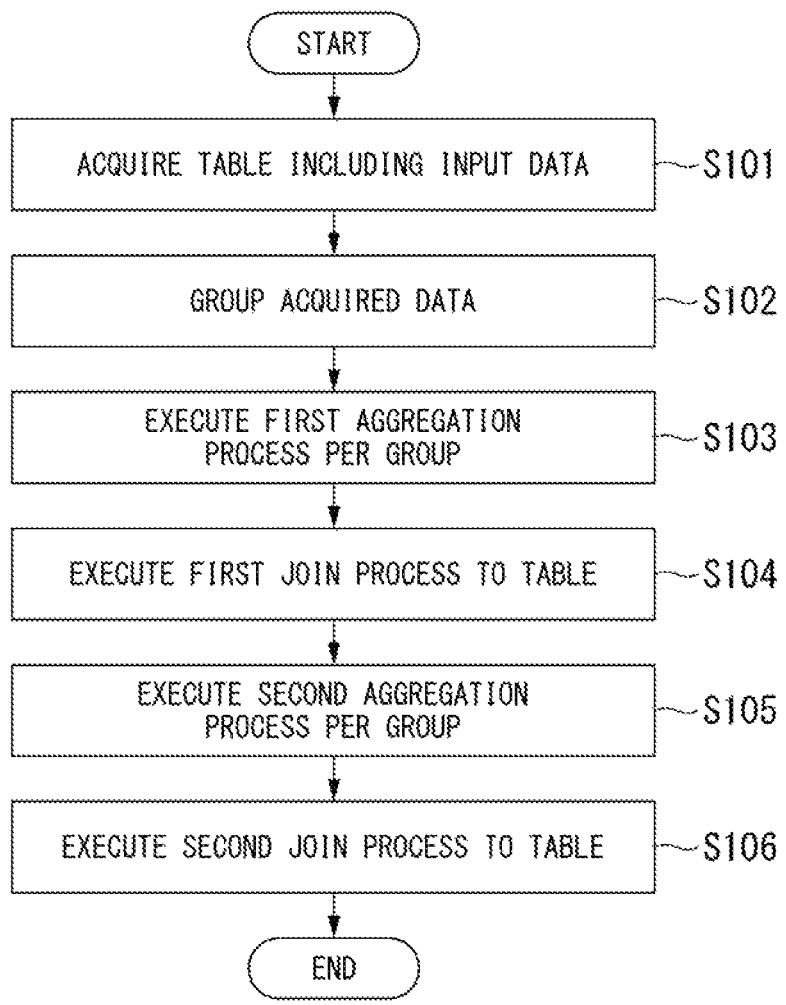
FIG. 6 is a flowchart showing the processing flow of the processing flow 1 in the first example embodiment.

FIG. 6 is a flowchart showing the processing flow 1 by the feature extraction program in the first example embodiment. In the example in FIG. 6, the feature extraction program includes a set of instructions that instruct the execution of processing flow 1. The flowchart shown in FIG. 6 corresponds to the processing flow in FIGS. 4 and 5.

In Step S101, the feature extraction program instructs the acquisition of the input table (initial input table). The input table includes a first plurality of values and a second plurality of values. Each of the second plurality of values corresponds to each of the first plurality of values. The input table is represented by multiple rows and columns. The input table may be the initial table T0.

In Step S102, the feature extraction program instructs the data contained in the acquired input table to be grouped by a predetermined rule (the first criterion). Details of the first criterion are discussed below.

In Step S103, the feature extraction program instructs the first aggregation process to be performed for each grouped group by a predetermined rule (second criterion). The first aggregation process may be represented as t1=sga1(t0, R2). t0 and t1 represent the input and output, respectively. t0 may be represented as the first argument. R2 indicates the second criterion. Details of the first aggregation process and the second criterion are discussed below.

In Step S104, the feature extraction program orders the execution of the first join process for t0. The first join process is a process that joins t1 with respect to t0. The first join process may be expressed as t2=join1(t0, t1). The process of joining may be referred to as a third criterion. The details of the first join process are described below.

In Step S105, the feature extraction program orders the execution of the second aggregation process on t2 (output of the first join process). The second aggregation process may be expressed as t3=sga2(t2, R4). R represents the fourth criterion. Details of the second aggregation process and the fourth criterion are discussed below.

In Step S106, the feature extraction program orders the execution of the second join process for t2. The second join process is a process that joins t3 with respect to t2. The second join process may be expressed as t4=join2(t2, t3). The details of the second join process are described below. This is the end of the instruction by the feature extraction program.

Figure 7:
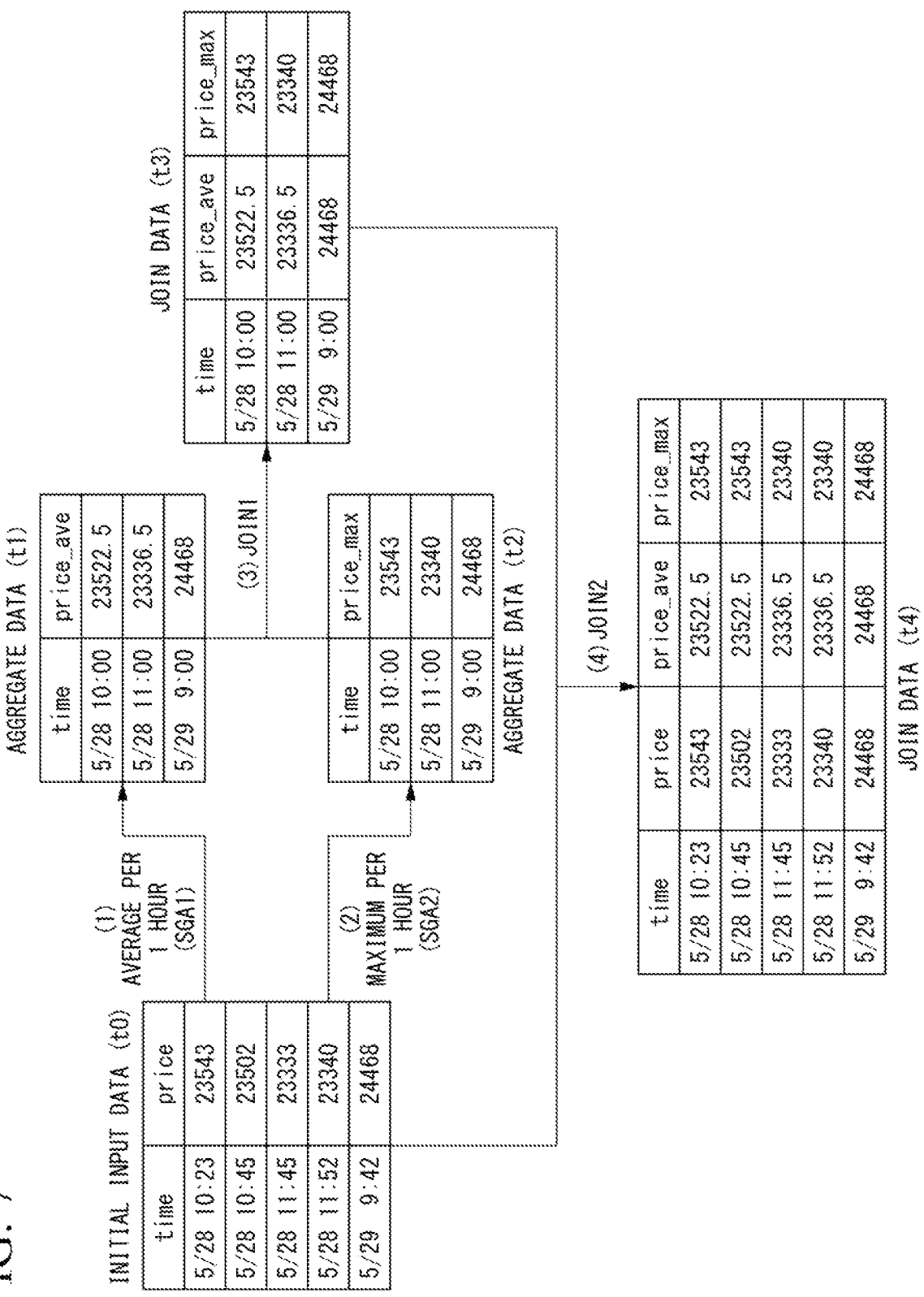
FIG. 7 is a schematic diagram showing the aggregation and join process in the first example embodiment.

FIG. 7 is a schematic diagram showing the aggregation and join process in the first example embodiment. In other words, FIG. 7 shows the flow of the processing flow 2 in FIG. 1. The aggregate transform portion 113 executes the aggregate transform process and rewrites the feature extraction program so as to change the inputs and outputs of the second aggregation process in the processing flow 1. In the example in FIG. 7, the feature extraction program includes a set of instructions that instruct the execution of processing flow 2.

The join transform portion 114 performs the join transform process and rewrites the feature extraction program so as to change the input of the first and second join processes and the output of the first join process. As a result, the process shown by the feature extraction program corresponds to processing flow 2. The processing of the aggregate transform portion 113 and the join transform portion 114 are described below.

After obtaining (selecting) the initial input table to, as process (1), the aggregate join processing portion 112 aggregates the average value for each time period in the first aggregation process, when the virtual currency amounts are grouped by time 1 hour, as the aggregate table t1.

As process (2), in the second aggregation process, the aggregate join processing portion 112 groups the virtual currency amounts by time hour. The aggregate join processing portion 112 aggregates the maximum value for each time period as an aggregation table t2.

As process (3), the aggregate join processing portion 112 joins the aggregate tables t1 and t2 in the first join process to obtain the join table t3. By the first join process, the number of rows in the joined table (intermediate table t3) remains 3, and in this respect, processing flow 2 differs from processing flow 1.

As process (4), the aggregate join processing portion 112 joins the initial input table t0 and the join table t in the second join process to obtain the join table t4.

The contents of the final join table t4 obtained by the processing flow 1 shown in FIGS. 4 and 5 and the final join table t4 obtained by the processing flow 2 shown in FIG. 7 are identical.

On the other hand, in processing flow 1 shown in FIGS. 4 and 5, when the aggregate join processing portion 112 performs the first join processing, it joins the aggregate table t1 with 3 rows to the initial input table to with 5 rows, resulting in the join table t2 as an intermediate table. As a result, intermediate table t2 has 5 rows of elements. On the other hand, in the processing flow 2 shown in FIG. 7, when the aggregate join processing portion 112 performs the first join processing, the number of rows of t1 and t2 to be joined is 3. As a result, the aggregate join processing portion 112 obtains the join table t3 as an intermediate table, but the number of rows in t3 is 3. Therefore, the size of the intermediate table can be smaller in processing flow 2 than in processing flow 1. In other words, the transformation to processing flow 2 reduces the processing load compared to processing flow 1.

Figure 8:
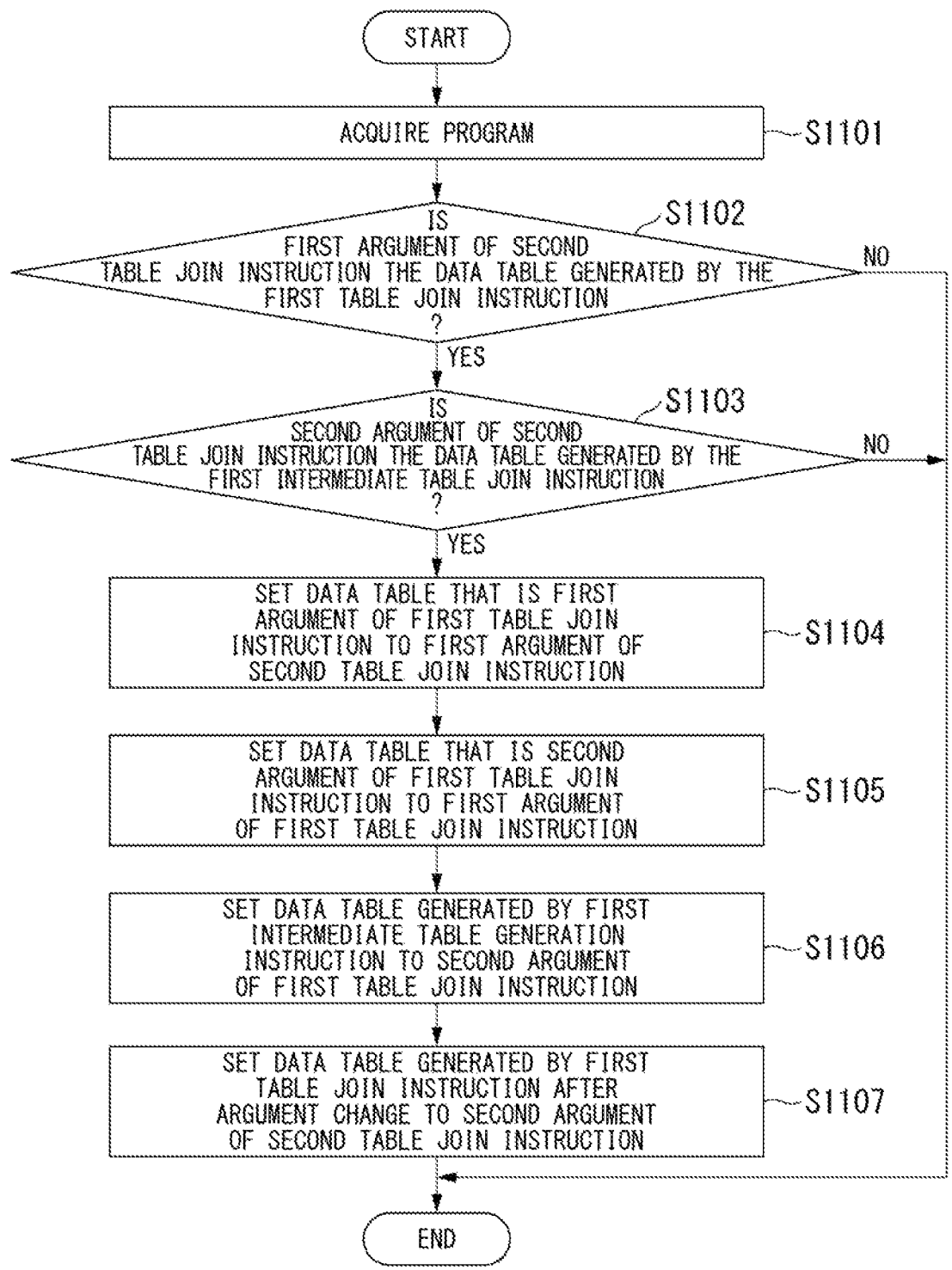
FIG. 8 is a flowchart showing the flow of the flow of the program transform process in the first example embodiment.

FIG. 8 is a flowchart showing the flow of the program transform process in the first example embodiment. The program transform process is a process in which the join transform portion 114 transforms a program that executes processing flow 1 into a program that executes processing flow 2.

In Step S1101, the acquisition portion 111 acquires the feature extraction program. As in the examples in FIGS. 6 and 7, in the example in FIG. 8, the feature extraction program is a set of instructions that instructs the execution of a series of processes pertaining to processing flow 1. The acquisition portion 111 may read the feature extraction program from the storage portion 116. The feature extraction program includes a first table join instruction, a second table join instruction, and a first intermediate table generation instruction.

The first table join instruction and the second table join instruction are instructions that execute the table join process. The aggregate join processing portion 112 executes the second table join instruction followed by the first table join instruction. The first intermediate table generation instruction instructs the generation of an intermediate table that exists after the generation of the initial input table and before the generation of the final joined table. The first intermediate table generation instruction may be an instruction to perform the aggregation process (SGA). The process proceeds to Step S1102.

In Step S1102, the join transform portion 114 determines whether the data table that is the first argument of the first table join instruction is the data table generated by the first table join instruction. If the determination result is Yes, processing proceeds to Step S1103. If the determination result is No, the processing ends.

In Step S1103, the join transform portion 114 determines whether the data table that is the second argument of the second table join instruction is the data table generated by the first intermediate table join instruction. If the determination result is Yes, processing proceeds to Step S1104. If the determination result is No, the processing ends.

In Step S1104, the join transform portion 114 sets the data table that is the first argument of the first table join instruction to the first argument of the second table join instruction. Here, the data table that is the first argument of the first table join instruction may be an initial input table. The processing proceeds to Step S1105.

In Step S1105, the join transform portion 114 sets the data table that is the second argument of the first table join instruction to the first argument of the first table join instruction. The data table, the second argument of the first table join instruction, may be generated by the SGA process. The processing proceeds to Step S1106.

In Step S1106, the join transform portion 114 sets the data table generated by the first intermediate table generation instruction to the second argument of the first table join instruction. The processing proceeds to Step S1107.

In Step S1107, the join transform portion 114 sets the data table generated by the first table join instruction after the argument changes in Step S1105 and Step S1106 to the second argument of the second table join instruction. The aggregate join processing portion 112 obtains the final table by executing the second table join instruction. Here, the first table join instruction corresponds to the first join process, and the second table join instruction corresponds to the second join process. The first argument in the first table join instruction after the argument change may be an initial input table.

In Step S1105 and Step S1106, if the two arguments in the first table join instruction are both obtained by SGA processing, the size of the data table (i.e., intermediate table) generated by the first table join instruction is smaller. This reduces the size of the intermediate table and thus the processing load when obtaining the features of the input data as the final table through the generation of intermediate tables.

Second Example Embodiment

Figure 9:
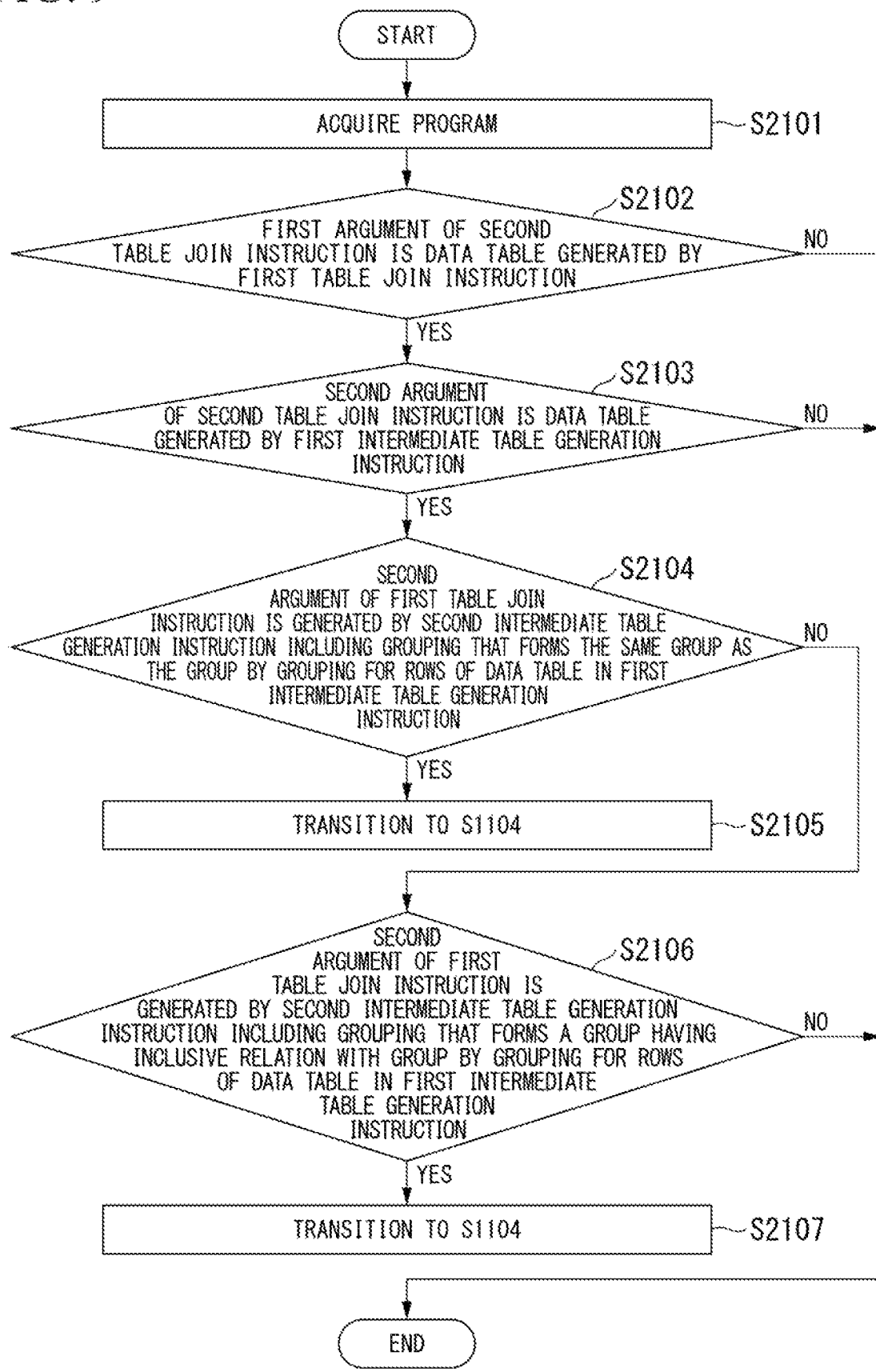
FIG. 9 is a flowchart showing the flow of the flow of the program transform process in the second example embodiment.

FIG. 9 is a flowchart showing the flow of the program transform process in the second example embodiment.

In Step S2101, the acquisition portion 111 acquires the feature extraction program. The processing proceeds to Step S2102.

In Step S2102, the join transform portion 114 determines whether the first argument of the second table join instruction is the data table generated by the first intermediate table join instruction. If the determination result is Yes, processing proceeds to Step S2103. If the determination result is No, the processing ends.

In Step S2103, the join transform portion 114 determines whether the second argument of the second table join instruction is the data table generated by the first intermediate table generation instruction. If the determination result is Yes, processing proceeds to Step S2104. If the determination result is No, the processing ends.

In Step S2104, the join transform portion 114 determines whether the second argument of the first table join instruction is generated by the second intermediate table generation instruction. The second intermediate table generation instruction is an intermediate table generation instruction that includes a grouping that forms the same group as the group by grouping for the rows of the data table in the first intermediate table generation instruction. If the determination result is Yes, processing proceeds to Step S2105. In this case, processing of Step S1104 or later of the first example embodiment is executed. If the determination result is No, processing proceeds to Step S2106.

In Step S2106, the join transform portion 114 determines whether the second argument of the first table join instruction is generated by the second intermediate table generation instruction. Here, the second intermediate table generation instruction may be an intermediate table generation instruction that includes a grouping that forms a group having an inclusive relation with the group by grouping for the rows of the data table in the first intermediate table generation instruction. If the determination result is Yes, processing proceeds to Step S2107. In this case, processing of Step S1104 or later of the first example embodiment is executed. The aggregate join processing portion 112 obtains the final table by executing the second table join instruction.

Here, "inclusive relation" refers to the case where one grouping unit encompasses the other grouping unit. For example, consider the case where one grouping unit groups the values in the data table every 5 minutes and the other grouping groups the values in the data table every 60 minutes. In this case, since 60 is a multiple of 5, the one grouping unit can be taken to encompass the other grouping unit.

In Step S1105 and Step S1106, if the two arguments in the first table join instruction are both obtained by SGA processing, the size of the data table (i.e., intermediate table) generated by the first table join instruction is smaller. This reduces the size of the intermediate table and thus the processing load when obtaining the features of the input data as the final table through the generation of intermediate tables.

Third Example Embodiment

Figure 10:
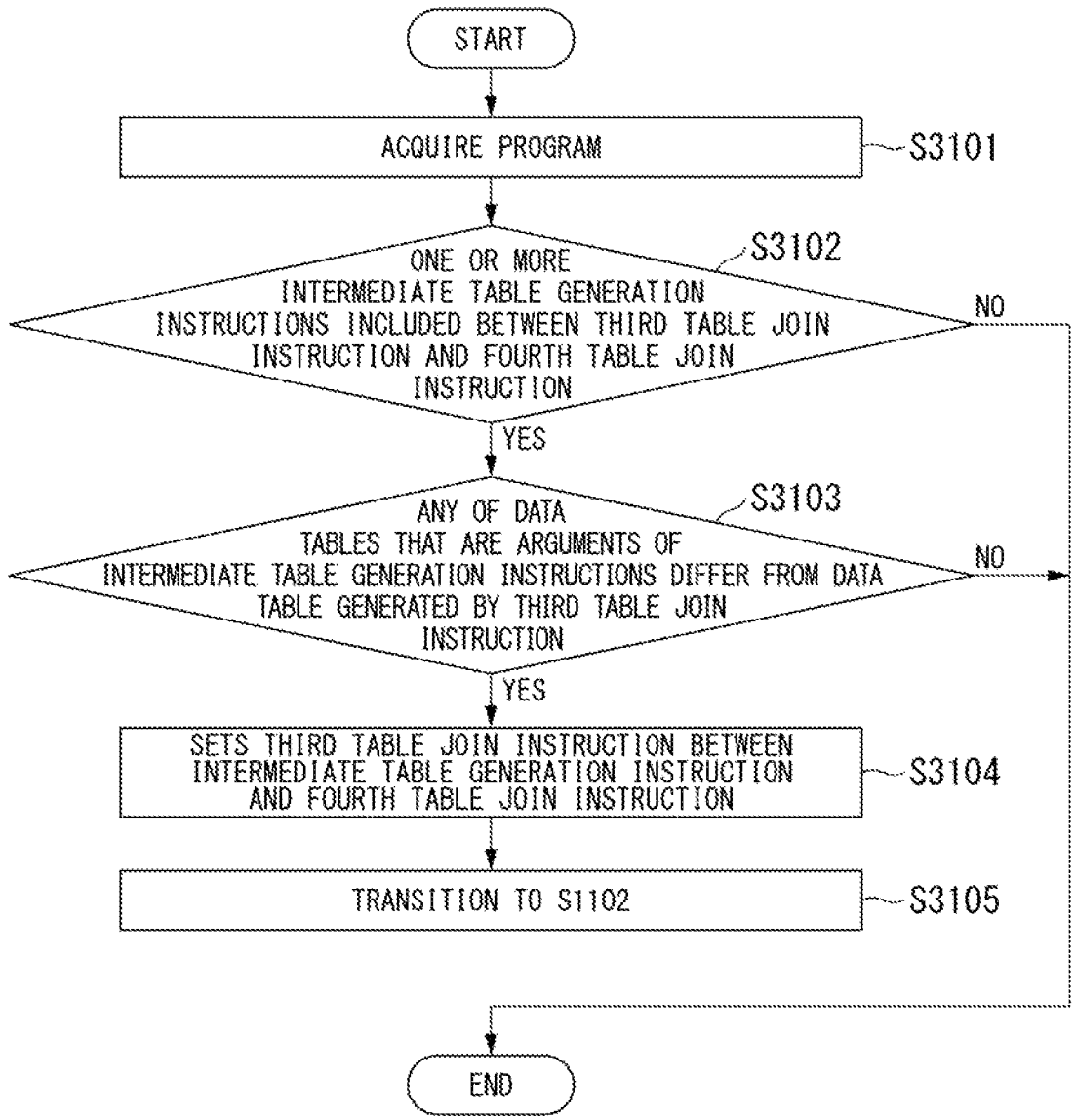
FIG. 10 is a flowchart showing the flow of the flow of the program transform process in the third example embodiment.

FIG. 10 is a flowchart showing the flow of the program transform process in the third example embodiment.

In Step S3101, the acquisition portion 111 acquires the feature extraction program. The processing proceeds to Step S3102.

In Step S3102, the join transform portion 114 determines whether one or more intermediate table generation instructions are included between the third table join instruction and the fourth table join instruction. The aggregate join processing portion 112 is configured to execute the fourth table join instruction after executing the third table join instruction. If the determination result is Yes, processing proceeds to Step S3103. If the determination result is No, the processing ends.

In Step S3103, the join transform portion 114 determines whether any of the data tables that are arguments of one or more intermediate table generation instructions are different from the data table generated by the third table join instruction. If the determination result is Yes, processing proceeds to Step S3104. If the determination result is No, the processing ends.

In Step S3104, the join transform portion 114 sets the third table join instruction between the intermediate table generation instruction and the fourth table join instruction. The fourth table join instruction may be an instruction to generate the final table. The join transform portion 114 may replace the second table join instruction with the first table join instruction. The join transform portion 114 may replace the fourth table join instruction with the second table join instruction process. The processing proceeds to Step S3105. Note that the third table join instruction corresponds to the first join process, and the fourth table join instruction corresponds to the second join process.

In Step S3105, the join transform portion 114 performs Step S1102 and subsequent processing. The processing then ends. In Step S1105 and Step S1106, if the two arguments in the first table join instruction are both obtained by SGA processing, the size of the data table (i.e., intermediate table) generated by the first table join instruction is smaller. This reduces the size of the intermediate table and thus the processing load when obtaining the features of the input data as the final table through the generation of intermediate tables.

Fourth Example Embodiment

Figure 11:
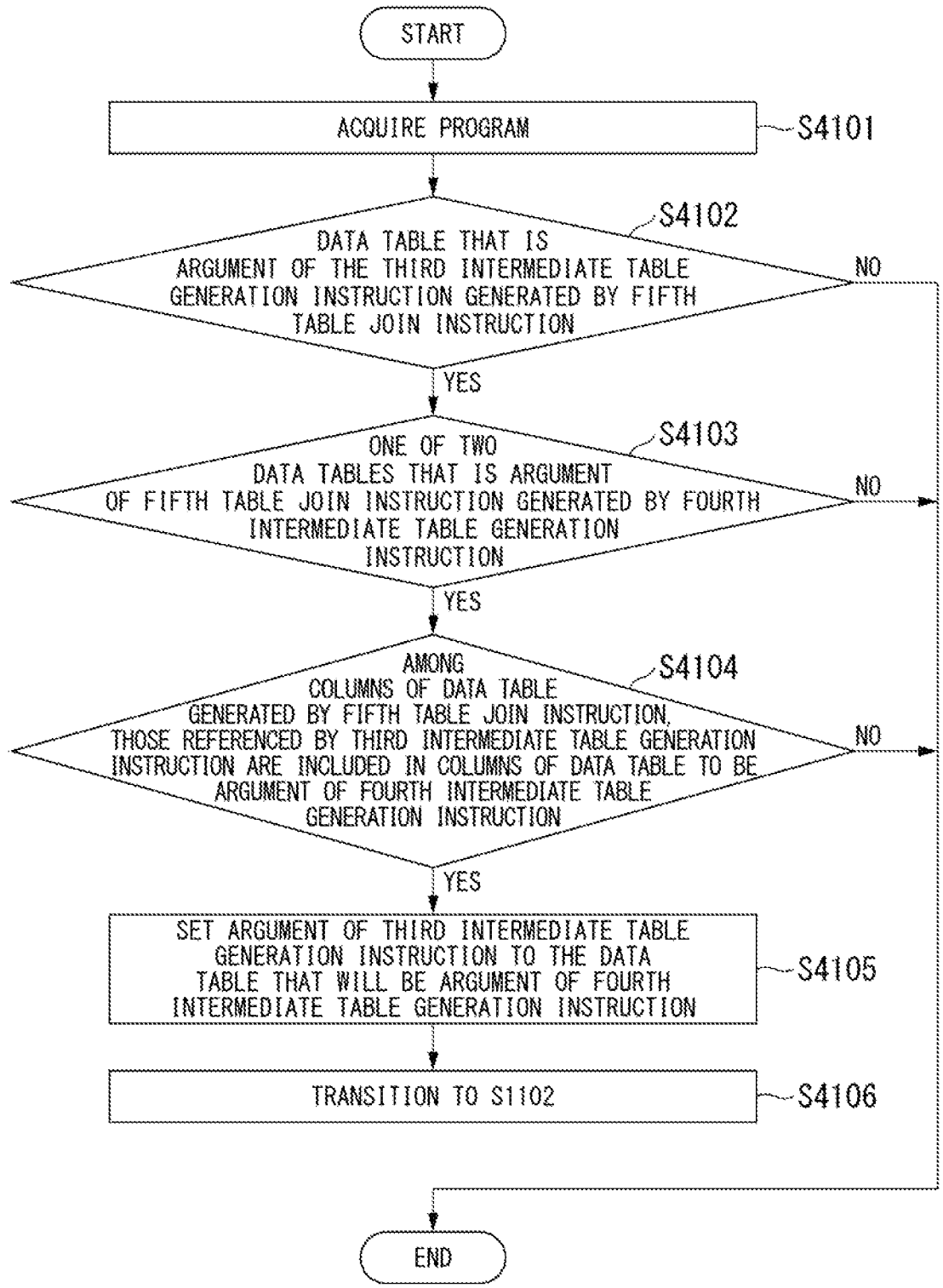
FIG. 11 is a flowchart showing the flow of the flow of the program transform process in the fourth example embodiment.

FIG. 11 is a flowchart showing the flow of the program transform process in the fourth example embodiment.

In Step S4101, the acquisition portion 111 acquires the feature extraction program. The processing the proceeds to Step S4102.

In Step S4102, the aggregate transform portion 113 determines whether the data table that is the argument of the third intermediate table generation instruction is generated by the fifth table join instruction. If the determination result is Yes, processing proceeds to Step S4103. If the determination result is No, the processing ends.

In Step S4103, the aggregate transform portion 113 determines whether one of the two data tables that is the argument of the fifth table join instruction has been generated by the fourth intermediate table generation instruction. The other of the two data tables that is the argument of the fifth table join instruction is the argument of the fourth intermediate table generation instruction. If the determination result is Yes, processing proceeds to Step S4104. If the determination result is No, the processing ends.

In Step S4104, among the columns of the data table generated by the fifth table join instruction, the aggregate transform portion 113 determines whether or not those referenced by the third intermediate table generation instruction are included in the columns of the data table that is the argument of the fourth intermediate table generation instruction. Note that "column" corresponds to "price" in the right column in the "Initial Input Data (Initial Input Table)" shown in FIG. 4, and indicates the column for which the aggregation process is performed. If the determination result is Yes, processing proceeds to Step S4105. If the determination result is No, the processing ends.

In Step S4105, the aggregate transform portion 113 sets the argument of the third intermediate table generation instruction to the data table that will be the argument of the fourth intermediate table generation instruction. The third intermediate table generation instruction may be the second aggregation process (instruction). The processing proceeds to Step S4106, and the join transform portion 114 performs Step S1102 and thereafter. The processing then ends. The third intermediate table generation instruction corresponds to the second aggregation process, and the fourth intermediate table generation instruction corresponds to the first aggregation process. The fifth table join instruction corresponds to the first join process.

In Step S1105 and Step S1106, if the two arguments in the first table join instruction are both obtained by SGA processing, the size of the data table (i.e., intermediate table) generated by the first table join instruction is smaller. This reduces the size of the intermediate table and thus the processing load when obtaining the features of the input data as the final table through the generation of intermediate tables.

The data table generated by the second table join instruction may include features used as training data in machine learning.

The data table that is the first argument of the second table join instruction after the argument change may be an initial input table or may include a first plurality of values and a second plurality of values corresponding to the first plurality of values.

The groups by grouping for the rows of the data table in the first intermediate table generation instruction are grouped based on predetermined criteria and include features.

Fifth Example Embodiment

Figure 12:
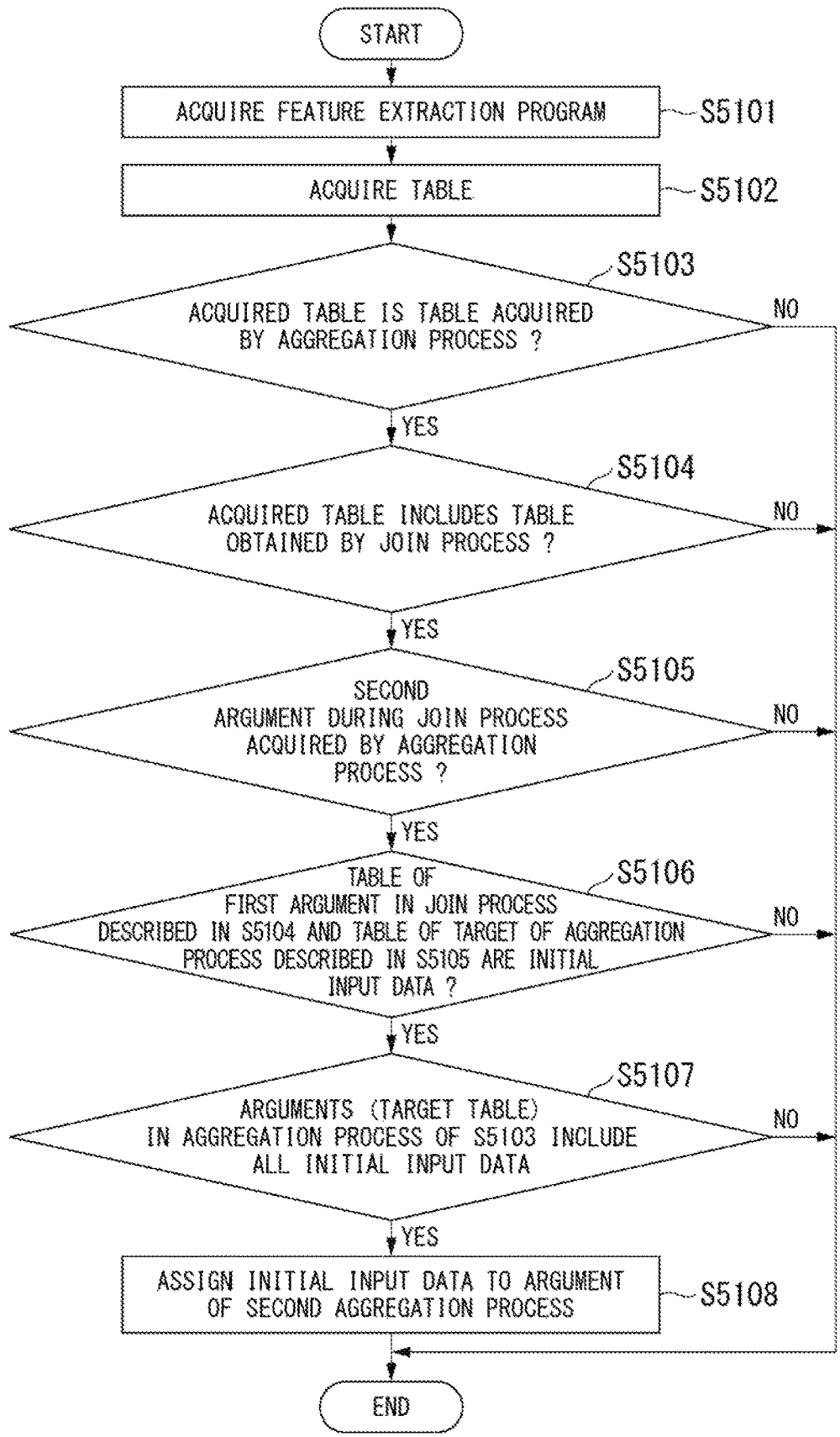
FIG. 12 is a flowchart showing the flow of the flow of the program transform process in the fifth example embodiment.

FIG. 12 is a flowchart showing the flow of the program transform process in the fifth example embodiment.

In Step S5101, the acquisition portion 111 acquires the feature extraction program. As in the examples in FIGS. 6 and 7, in the example in FIG. 12, the feature extraction program is a set of instructions that instructs the execution of a series of processes. The acquisition portion 111 may read the feature extraction program from the storage portion 116. The feature extraction program instructs the acquisition of input data (initial input data, initial input table) containing the first plurality of values and the second plurality of values. The first plurality of values is, for example, time. The second plurality of values is, for example, the amount of virtual currency corresponding to each time (first plurality of values).

The feature extraction program instructs the generation of features (final table) of the data included in the input table by executing the first aggregation process (first aggregation instruction, first intermediate table generation instruction), the first join process (first join instruction, first table join instruction), the second aggregation process (second aggregation instruction, second intermediate table generation instruction), and the second join process (second join instruction, second table join instruction).

In the first aggregation process, the feature extraction program generates a first aggregate value (aggregate data t1 or aggregate table t1) based on the first argument (t0) containing the first plurality of values and the second plurality of values, and the first and second criteria. t0 shall be the same as described in FIG. 4. The feature extraction program includes the function sga1( ) for performing the first aggregation process. t0 is the argument of sga1( ). t1 is the output of sga1( ).

In the first join process, the feature extraction program instructs the generation of first join data (intermediate data t2 or join table t2) based on a second argument (t0) containing the first plurality of values and the second plurality of values, a third argument (t1) containing the first aggregate value, and the third criterion. The feature extraction program includes the function join1( ) to perform the first join process. t0 and t1 are the arguments of join1( ). t2 is the output of join1( ).

In the second aggregation process, the feature extraction program instructs the generation of a second aggregate value (aggregate data t3 or aggregate table t3) based on a fourth argument including the first join data (12) and a fourth criterion. The feature extraction program includes the function sga2( ) to perform the second aggregation process. The fourth argument is the argument of sga2( ). The second aggregate value is the output of sga2( ).

In the second join process, the feature extraction program instructs the generation of features of the input data by generating the second join data (final data t4 or final table t4) based on the fifth argument including the first join data (t2), the sixth argument including the second aggregate value (t3) and the third criterion. The feature extraction program includes the function join2( ) to perform the second join process. The fifth and sixth arguments are the arguments of join2( ). t4 is the output of join2( ).

In the first aggregation process, the feature extraction program instructs the grouping of the second plurality of values into a plurality of groups based on the first criterion (e.g., grouping by hour), and acquisition of the first aggregate value based on the values in each of the plurality of groups and the second criterion (e.g., obtaining an average of the second plurality of values for each group).

In the second aggregation process, the feature extraction program instructs the acquisition of the second aggregate value based on the values in each of the plurality of groups, and the fourth criterion (e.g., acquiring the maximum value of the second plurality of values for each group).

In Step S5102, the aggregate transform portion 113 acquires a table generated based on the feature extraction program. The processing the proceeds to Step S5103.

In Step S5103, the aggregate transform portion 113 determines whether the acquired table is a table acquired by the aggregation process. If the determination result is Yes, the aggregate transform portion 113 proceeds to Step S5104. If the determination result is No, the processing ends.

In Step S5104, the aggregate transform portion 113 determines whether the acquired table includes the table obtained by the join process. Specifically, the aggregate transform portion 113 determines whether the argument of the aggregation process described in step S5103 (the fourth argument) is a table obtained by a join process (the third criterion) with the seventh and eighth arguments as input. If the determination result is Yes, processing proceeds to Step S5105. If the determination result is No, the processing ends. The processing in this step corresponds to the processing in Step S4102 in the fourth example embodiment.

In Step S5105, the aggregate transform portion 113 determines whether the second argument (eighth argument) during the join process in Step S5104 is obtained by the ninth argument and the aggregation process (second or fourth criterion). If the determination result is Yes, processing proceeds to Step S5106. If the determination result is No, the processing ends.

In Step S5106, the aggregate transform portion 113 determines whether the table of the first argument (seventh argument) in the join process described in Step S5104 and the table of the target of the aggregation process (ninth argument) described in Step S5105 are initial input data (t0) containing the first plurality and second plurality of values. If the determination result is Yes, the aggregate transform portion 113 determines that the join process described in Step S5104 is a join process in which the result aggregated from the initial input data to is added to t0 (that is, the first join process), and the processing proceeds to Step S5107. If the determination result is No, the processing ends. The processing of Step S5105 and Step S5106 corresponds to the processing of Step S4103 in the fourth example embodiment.

In Step S5107, the aggregate transform portion 113 determines whether the arguments (fourth argument or target table) in the aggregation process described in Step S5103 include all the initial input data. In other words, the aggregate transform portion 113 determines whether the arguments (target tables) in the aggregation process described in Step S5103 include tables that have not been aggregated. The process in Step S5107 corresponds to the process in Step S4104 in the fourth example embodiment.

If the determination result is Yes, the aggregate transform portion 113 determines that the table obtained in Step S5102 is the table obtained by the second aggregation process. In other words, the aggregate transform portion 113 determines that the aggregation process described in Step S5103 is the second aggregation process. The aggregate transform portion 113 replaces the target table (fourth argument) in the aggregation process described in Step S5103 shown in the feature extraction program with t0 (first argument).

As a result, the aggregate value (third aggregate value) generated by the aggregation process described in Step S5103 corresponds to the result of the aggregation processing by the aggregate join portion processing portion 112 according to the fourth criteria on the initial input data to. These processes correspond to the process of Step S4105 in the fourth example embodiment. The aggregate transform portion 113 may update the feature extraction program and store it in the storage portion 116. The output portion 115 may output or display the updated feature extraction program.

Figure 13:
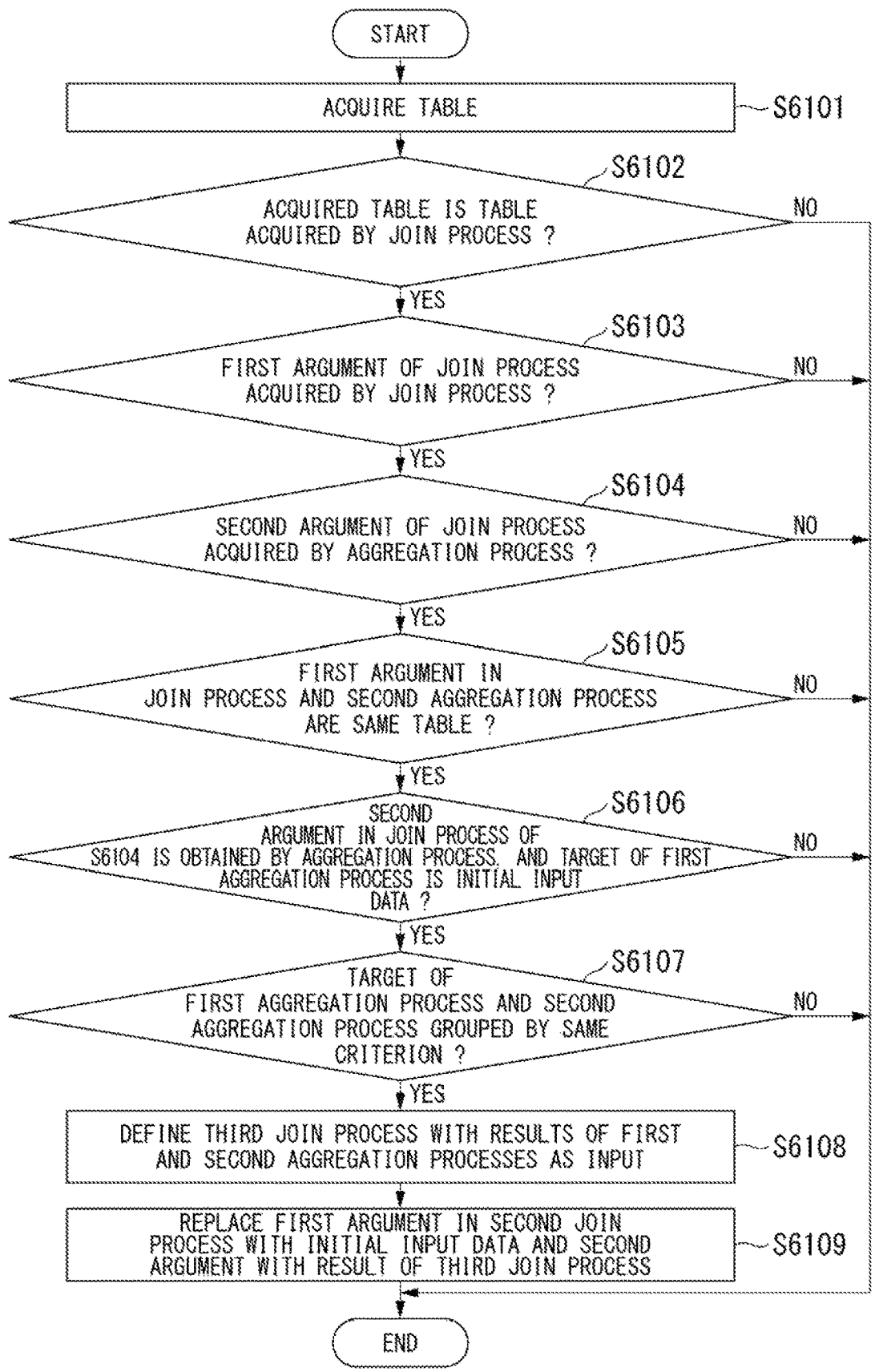
FIG. 13 is a flowchart showing the flow of the flow of the program transform process in the fifth example embodiment.

FIG. 13 is a flowchart showing the flow of the join transform process in the fifth example embodiment. The join transform process is a process in which the join transform portion 114 transforms the inputs of the first and second join processes in the processing flow 1. As a result, in the processing flow 2, the output of the first join process, i.e., the contents of the intermediate table T1', will be different from the processing flow 1.

In Step S6101, the join transform portion 114 obtains the table generated by the feature extraction program by reading it from the storage portion 116. The join transform portion 114 advances the processing to Step S6102.

In Step S6102, the join transform portion 114 determines whether the acquired table is a table obtained by the join process. If the determination result is Yes, processing proceeds to Step S6103. If the determination result is No, the processing ends.

In Step S6103, the join transform portion 114 determines whether the first argument (fifth argument) of the join process of Step S6102 is obtained by the join process (third criterion) with the tenth and eleventh arguments. The processing in this step corresponds to the processing in Step S1102 in the first example embodiment. If the determination result is Yes, the processing proceeds to Step S6104. If the determination result is No, the processing ends.

In Step S6104, the join transform portion 114 determines whether the second argument (sixth argument) of the join process of Step S6102 is generated based on the twelfth argument, the first criterion, and the aggregation process (second or fourth criterion). This step corresponds to Step S1103 in the first example embodiment. If the determination result is Yes, the processing proceeds to Step S6105. If the determination result is No, the processing ends.

Step S6105 determines whether the tenth argument and twelfth argument are the same table (initial input data containing the first and second plurality of values). If the determination result is Yes, the processing proceeds to Step S6106. If the determination result is No, the processing ends.

Step S6106 determines whether the 11th argument is generated based on the initial input data (t0), the first criterion, and the aggregation process (second or fourth criterion). The processing of this step corresponds to the processing of Step S2105 in the second example embodiment. If the determination result is Yes, the processing proceeds to Step S6107. If the determination result is No, the processing ends.

In Step S6107, the join transform portion 114 determines whether the aggregation process in Step S6104 and the aggregation process in step S6106 are grouped by the same rule (first criterion). While not the same, one grouping rule may be encompassed by the other grouping rule. The processing of this step corresponds to the processing of Step S2106 in the second example embodiment.

Here, "encompassed" may mean, for example, that one grouping rule groups the first plurality of values every 5 minutes and performs the aggregation process according to the second or fourth criteria for the second plurality of values included in each group. The other grouping rule may then group the first plurality of values every 60 minutes and perform the aggregation process according to the second or fourth criteria for the second plurality of values included in each group. If the determination result is Yes, the processing proceeds to Step S6108. If the determination result is No, the processing ends.

In Step S6108, the join transform portion 114 determines the join process described in Step S6104 to be the first join process, defines a third join process as an alternative to the first join process, and rewrites the feature extraction program. The third join process is a process that generates third join data using the second argument and the third aggregate value as input. The processing of this step corresponds to the processing of steps S1105 and S1106 in the first example embodiment. The processing proceeds to Step S6109.

In Step S6109, the join transform portion 114 determines that the table obtained in Step S6102 is obtained by the second join process. The join transform portion 114 rewrites the feature extraction program so as to generate the second join data using the first argument instead of the fifth argument (i.e., as the first argument) and using the third join data instead of the sixth argument (i.e., as the second argument) in the second join process. These processes correspond to the processes in Step S1104 and Step S1107 in the first example embodiment. The join transform portion 114 may store the rewritten feature extraction program in the storage portion 116. The output portion 115 may output the rewritten feature extraction program. Here, the second join data generated in Step S6109 is the same as the join data finally generated in case of the processing flow 1.

As described above, the information processing device according to the present disclosure is provided with an acquisition means that acquires an input table including a first plurality of values and a second plurality of values, and acquires a feature extraction program that instructs the generation of features of input data by executing a first aggregation process based on a first argument including the first plurality of values and the second plurality of values, and a first and second criteria; a first join process that generates first join data based on a second argument including the first plurality of values and the second plurality of values, a third argument including a first aggregate value, and a third criterion; a second aggregation process based on a fourth argument including the first join data and a fourth criterion; and a second join process that generates second join data based on a fifth argument including the first join data, a sixth argument including a second aggregate value, and a third criterion; an aggregate transform means that, based on the process of generating the fourth argument, replaces the first argument in the second aggregation process with a process that aggregates as the third aggregate value by using the first argument in place of the fourth argument; and a join transform means that, based on the process for generating the fifth and sixth arguments, replaces the process for generating the third join data by using the third aggregate value in place of the second argument in the first join process, and replaces the process for generating the second join data by using the first argument in place of the fifth argument and the third join data in place of the sixth argument in the second join process.

This reduces the size of the intermediate table and thus the processing load when obtaining the features of the input data as the final table through the generation of intermediate tables.

When the feature extraction program indicates that, in the first aggregation process, the second plurality of values are grouped into a plurality of groups based on the first criterion and aggregated as the first aggregate value based on the values in each of the plurality of groups and the second criterion, in the second aggregation process, the feature extraction program indicates that the second plurality of values are aggregated as a second aggregate value based on the values in each of the plurality of groups and the fourth criterion, and the feature extraction program indicates that the fourth argument is generated based on the seventh and eighth arguments and the third criterion, the eighth argument is generated based on the ninth argument and the second or fourth criterion, the seventh and ninth arguments include the first plurality and second plurality of values, and the fourth argument includes input data, and when the feature extraction program indicates that replaces the second aggregation process with a progress that aggregates as third aggregate value by the aggregate transform means replaces the first argument in the second aggregation process with a process that aggregates as the third aggregate value by using the first argument in place of the fourth argument, the join transform means replaces the first join process with a process that generates the third join data by using the third aggregate value in place of the second argument, and replaces the second join process with a process that generates the second join data by using the first argument in place of the fifth argument and the third join data in place of the sixth argument.

This reduces the size of the intermediate table and thus the processing load when obtaining the features of the input data as the final table through the generation of intermediate tables.

The features may also be used as training data in machine learning. Each of the second plurality of values corresponds to each of the first plurality of values.

The first aggregate value includes aggregate values corresponding to each of the multiple groups.

The aggregate value corresponding to each of the plurality of groups is the average, minimum or maximum value of the values in each of the plurality of groups.

This reduces the size of the intermediate table and thus the processing load when obtaining the features of the input data as the final table through the generation of intermediate tables.

Although the above example embodiments of this invention have been described in detail with reference to the drawings, specific configurations are not limited to these example embodiments, but also include designs, and the like to the extent that they do not depart from the gist of this invention.

A processing method in which a program to operate the configuration of the example embodiments to realize the functions of the example embodiments described above is recorded in a storage medium, and the program recorded in the storage medium is read as code and executed on a computer is also included within the scope of each example embodiment. In other words, computer-readable storage media are also included in the scope of each example embodiment. In addition, not only the storage medium in which the above-mentioned program is recorded, but also the program itself is included in each example embodiment. One or more components included in the example embodiments described above may be an ASIC (Application Specific Integrated Circuit), FPGA (Field Programmable Gate Array), or other circuit configured to realize the functions of each component.

For example, floppy (registered trademark) disks, hard disks, optical disks, optical magnetic disks, CD (Compact Disk)-ROMs, magnetic tapes, non-volatile memory cards, and ROMs can be used as the storage media. The programs recorded on the storage media are not limited to those that execute processing by themselves, but also include those that operate on an OS (Operating System) and execute processing in collaboration with other software and expansion board functions.

The services realized by the functions of each of the above example embodiments can also be provided to users in the form of Saas (Software as a Service).

The example embodiments described above are merely examples of example embodiments for implementing the present disclosure, and the technical scope of the present disclosure should not be interpreted as being limited by them. In other words, the present disclosure can be implemented in various forms without deviating from the technical concept thereof or the main features thereof.

Figure 14:
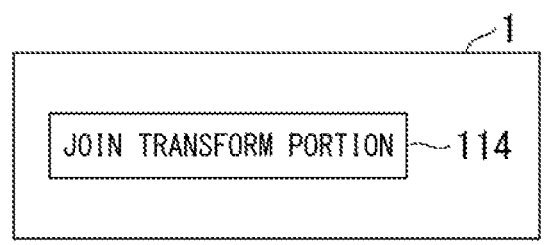
FIG. 14 is a diagram showing the minimum configuration of the information processing device 1 in the present disclosure.

FIG. 14 is a diagram showing the minimum configuration of the information processing device 1 in the present disclosure.

The information processing device 1 according to the present example embodiment should have at least the join transform portion 114. The flow of processing by the join transform portion 114 is as in Step S1102 to Step S1107 in the flowchart described in FIG. 8.

DESCRIPTION OF REFERENCE SIGNS

1 Information processing device
101 CPU
102 RAM
103 ROM
104 HDD
105 Communication IF
106 Input device
107 Output device
111 Acquisition portion
112 Aggregate join processing portion
113 Aggregate transform portion
114 Join transform portion
115 Output portion
116 Storage portion

What is claimed is:

1. An information processing device comprising:
at least one memory configured to store instructions; and
at least one processor configured to execute the instructions to:
  when a first argument of a second table join instruction is a data table generated by a first table join instruction, wherein the first table join instruction and the second table join instruction are table join instructions and the second table join instruction is executed consecutively after the first table join instruction, and
  when a second argument of the second table join instruction is the data table generated by a first intermediate table generation instruction, wherein the first intermediate table generation instruction is an intermediate table generation instruction having a first argument of the first table join instruction as an argument, the first argument of the first table join instruction being the data table,
  set the first argument of the first table join instruction to the second table join instruction as the first argument of the second table join instruction;
  set a second argument of the first table join instruction to the first table join instruction as the first argument of the first table join instruction;
  set a first output data table generated by the first intermediate table generation instruction to the first table join instruction as the second argument of the first table join instruction; and
  set a second output data table generated by the first table join instruction after changing the first and second arguments of the first table join instruction to the second table join instruction as the second argument of the second table join instruction.

2. The information processing device according to claim 1, wherein the at least one processor is configured to execute the instructions to:

when the first argument of the second table join instruction is a data table generated by the first table join instruction, when the second argument of the second table join instruction is the first output data table generated by the first intermediate table generation instruction, and when a first group is same as a group by grouping for rows of the data table in the first intermediate table generation instruction, the second argument of the first table join instruction belonging to the first group, or the second argument of the first table join instruction is a data table generated by a second intermediate table generation instruction, wherein the second intermediate table generation instruction is the intermediate table generation instruction that includes a grouping forming a group having an inclusive relationship with a group by grouping for rows of the data table in the first intermediate table generation instruction, set the first argument of the first table join instruction to the second table join instruction as the first argument of the second table join instruction;

set the second argument of the first table join instruction to the first table join instruction as the first argument of the first table join instruction;

set the first output data table generated by the first intermediate table generation instruction to the first table join instruction as the second argument of the first table join instruction; and set the second output data table generated by the first table join instruction after changing the first and second arguments of the first table join instruction to the second table join instruction as the second argument of the second table join instruction.

3. The information processing device according to claim 1, wherein the at least one processor is configured to execute the instructions to:

when one or more intermediate table join instructions are included between a third table join instruction and a fourth table join instruction among a plurality of the table join instructions in the program to be transformed, wherein the forth table join instruction is executed later than the third table join instruction, and arguments of the one or more intermediate table join instructions are data tables and different from a data table generated by the third table join instruction, when the first argument of the second table join instruction is the data table generated by the first table join instruction after setting the third table join instruction between the one or more intermediate table join and the fourth table join instruction, and when the second argument of the second table join instruction is the first output data table generated by the first intermediate table generation instruction, set the first argument of the first table join instruction to the second table join instruction as the first argument of the second table join instruction;

move the second argument of the first table join instruction to the first argument of the first table join instruction;

set the first output data table generated by the first intermediate table generation instruction to the first table join instruction as the second argument of the first table join instruction; and set the second output data table generated by the first table join instruction after changing the first and second arguments of the first table join instruction to the second table join instruction as the second argument of the second table join instruction.

4. The information processing device according to claim 1, wherein the at least one processor is configured to execute the instructions to:

when an argument of a third intermediate table generation instruction in the program to be transformed is generated by a fifth table join instruction, wherein the third intermediate table generation instruction is the intermediate table generation instruction and the fifth table join instruction is the table join instruction, when an argument of the fifth table join instruction includes two data tables and one of the two data tables is generated by a fourth intermediate table generation instruction, wherein the fourth intermediate table generation instruction is the intermediate table generation instruction and includes another of the two data tables as an argument of the fourth intermediate table generation instruction, and when, among columns of the data table generated by the fifth table join instruction, a column referred to by the third intermediate table generation instruction is included in a column of an argument of the fourth intermediate table generation instruction, set the argument of the fourth intermediate table generation instruction to the third intermediate table generation instruction as the argument of the third intermediate table generation instruction, for the program after setting the argument of the fourth intermediate table generation instruction to the third intermediate table generation instruction, when the first argument of the second table join instruction is a data table generated by the first table join instruction, and when the second argument of the second table join instruction is the first data table generated by the first intermediate table generation instruction, set the first argument of the second table join instruction to the first table join instruction as the first argument of the first table join instruction;

set the second argument of the first table join instruction to the first table join instruction as the first argument of the first table join instruction;

set the second argument of the first table join instruction to the first intermediate table generation instruction as the first output data table generated by the first intermediate table generation instruction; and set the second output data table generated by the first table join instruction after changing the first and second arguments of the first table join instruction to the second table join instruction as the second argument of the second table join instruction.

5. The information processing device according to claim 1, wherein the data table generated by the second table join instruction includes features used as training data in machine learning.

6. The information processing device according to claim 5, wherein the groups obtained by grouping for the rows of the data table in the first intermediate table generation instruction are grouped based on predetermined criteria and include the features.

7. The information processing device according to claim 1, wherein the first argument of the second table join instruction after changing the first and second arguments of the second table join instruction includes a first plurality of values and a second plurality of values corresponding to the first plurality of values.

8. A method executed in a computer, comprising:

in a program to be transformed, when a first argument of a second table join instruction is a data table generated by a first table join instruction, wherein the first table join instruction and the second table join instruction are table join instructions and the second table join instruction is executed consecutively after the first table join instruction, and when a second argument of the second join instruction is the data table generated by a first intermediate table generation instruction, wherein the first intermediate table generation instruction is an intermediate table generation instruction having a first argument of the first table join instruction as an argument, the first argument of the first table join instruction being the data table, setting the first argument of the first table join instruction to the second table join instruction as the first argument of the second table join instruction;

setting a second argument of the first table join instruction to the first table join instruction as the first argument of the first table join instruction;

setting a first output data table generated by the first intermediate table generation instruction to the first table join instruction as the second argument of the first table join instruction; and setting a second output data table generated by the first table join instruction after changing the first and second arguments of the first table join instruction to the second table join instruction as the second argument of the second table join instruction.

9. A non-transitory recording medium in which is recorded a program that causes a computer to execute:

in a program to be transformed, when a first argument of a second table join instruction is a data table generated by a first table join instruction, wherein the first table join instruction and the second table join instruction are table join instructions and the second table join instruction is executed consecutively after the first table join instruction, and when a second argument of the second table join instruction is the data table generated by a first intermediate table generation instruction, wherein the first intermediate table generation instruction is an intermediate table generation instruction having a first argument of the first table join instruction as an argument, the first argument of the first table join instruction being the data table, setting the first argument of the first table join instruction to the second table join instruction as the first argument of the second table join instruction;

setting a second argument of the first table join instruction to the first table join instruction as the first argument of the first table join instruction;

setting a first output data table generated by the first intermediate table generation instruction to the first table join instruction as the second argument of the first table join instruction; and setting a second output data table generated by the first table join instruction after changing the first and second arguments of the first table join instruction to the second table join instruction as the second argument of the second table join instruction.

* * * * *